United States Patent
Qin et al.

(10) Patent No.: US 9,674,454 B2
(45) Date of Patent: Jun. 6, 2017

(54) LIGHT METERING METHODS AND DEVICES

(71) Applicant: Xiaomi Inc., Beijing (CN)

(72) Inventors: Qiuping Qin, Beijing (CN); Tao Zhang, Beijing (CN); Lin Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/624,984

(22) Filed: Feb. 18, 2015

(65) Prior Publication Data

US 2016/0037039 A1     Feb. 4, 2016

Related U.S. Application Data

(63) Continuation of application No. PCT/CN2014/091557, filed on Nov. 19, 2014.

(30) Foreign Application Priority Data

Jul. 31, 2014   (CN) .......................... 2014 1 0373717

(51) Int. Cl.
  *H04N 5/235*   (2006.01)
  *H04N 5/232*   (2006.01)

(52) U.S. Cl.
  CPC ....... *H04N 5/2351* (2013.01); *H04N 5/23216* (2013.01); *H04N 5/23293* (2013.01)

(58) Field of Classification Search
  CPC ............. H04N 5/2351; H04N 5/23293; H04N 5/23216; H04N 5/2353; H04N 5/3696
  See application file for complete search history.

(56) References Cited

U.S. PATENT DOCUMENTS

| 7,034,881 | B1 | 4/2006 | Hyodo et al. |
| 8,120,664 | B2 | 2/2012 | Nozaki et al. |
| 8,319,848 | B2 | 11/2012 | Usui et al. |
| 8,830,343 | B2 | 9/2014 | Nozaki et al. |
| 8,908,061 | B2 * | 12/2014 | Kubota .............. H04N 5/23212 348/223.1 |

(Continued)

FOREIGN PATENT DOCUMENTS

| CN | 1652577 | 8/2005 |
| CN | 101202841 A | 6/2008 |

(Continued)

OTHER PUBLICATIONS

International Search Report of PCT/CN2014/091557, mailed from the State Intellectual Property Office of China on May 28, 2015.

(Continued)

*Primary Examiner* — Twyler Haskins
*Assistant Examiner* — Fayez Bhuiyan
(74) *Attorney, Agent, or Firm* — Finnegan, Henderson, Farabow, Garrett & Dunner LLP

(57) ABSTRACT

A light metering method is provided. The method includes: acquiring a touch screen point inputted by a user; identifying an initial light metering area based on an image displayed on a touchscreen, the initial light metering area containing the touch screen point; segmenting the initial light metering area into a background region and an object region containing the touch screen point; and performing light metering on image points within the object region.

18 Claims, 11 Drawing Sheets

(56) References Cited

U.S. PATENT DOCUMENTS

| | | |
|---|---|---|
| 2005/0174451 A1 | 8/2005 | Nozaki et al. |
| 2010/0020221 A1 | 1/2010 | Tupman et al. |
| 2010/0111489 A1 | 5/2010 | Presler |
| 2010/0214429 A1 | 8/2010 | Usui et al. |
| 2012/0105684 A1 | 5/2012 | Nozaki et al. |
| 2013/0321687 A1 | 12/2013 | Negroponte et al. |
| 2014/0118601 A1 | 5/2014 | Myung |

FOREIGN PATENT DOCUMENTS

| | | |
|---|---|---|
| CN | 101543051 A | 9/2009 |
| CN | 101820504 | 9/2010 |
| CN | 103139481 A | 6/2013 |
| CN | 103795917 | 5/2014 |
| CN | 103858043 | 6/2014 |
| EP | 2 698 693 A | 2/2014 |
| JP | 11-136568 | 5/1999 |
| JP | 2010072619 A | 4/2010 |
| JP | 2014-010717 | 1/2014 |

OTHER PUBLICATIONS

Notification on Results of Examination of Invention Patentability for Russian Application No. 2015105744/08 (009226), dated Apr. 29, 2016 (14 pages).

Extended European Search Report for Application No. 15179325.4, received from the European Patent Office, dated Dec. 17, 2015 (9 pages).

English Translation of International Search Report for International Application No. PCT/CN2014/091557, dated May 25, 2015 (2 pages).

Weiwei Li et al., "Application of Seeded Region Growing to Color Image Segmentation," Journal of Chinese Computer Systems, vol. 29, No. 6, dated Jun. 6, 2008 (5 pages).

Tinghuai Wang et al., "TouchCut: Fast Image and Video Segmentation Using Single-Touch Interaction," Computer Vision and Image Understanding, Mar. 1, 2014 (17 pages).

Jiayi Liang et al., "An Auto-Exposure Algorithm for Detecting High Contrast Lighting Conditions," 2007 $7^{th}$ International Conference on ASIC, Oct. 1, 2007 (4 pages).

* cited by examiner

600

LIGHT METERING METHODS AND DEVICES

CROSS-REFERENCE TO RELATED APPLICATIONS

This application is a continuation of International Application No. PCT/CN2014/091557, filed Nov. 19, 2014, which is based on and claims priority to Chinese Patent Application No. 201410373717.0, filed Jul. 31, 2014, the entire contents of all of which are incorporated herein by reference.

TECHNICAL FIELD

The present disclosure generally relates to the field of terminal devices and, more particularly, to light metering methods and devices.

BACKGROUND

Light metering is a process of measuring a brightness of an object to be photographed, which is a basis of automatic exposure of a camera so as to capture images in pictures. Accurate light metering and correct light metering manner selection are often the starting point of photography creation.

For example, generally the light metering manner of a light metering system of a digital camera is Through The Lens (TTL), which meters the intensity of light reflected by an object to be photographed through the lens. A light metering sensor is placed in a photography light path, and light is reflected from a retroreflector onto a light metering element for light metering. Light intensity data is transmitted to a processor of the camera, and an exposure combination, such as a combination of a shooting aperture and a shutter speed, is then determined. According to different areas, sizes and calculation weights metered in a viewfinder coverage by the light metering sensor, light metering manners may be classified into: average metering, center-weighted metering, spot metering, matrix metering and other modes.

For example, in spot metering, a light metering range is a region at the center of a viewfinder image that occupies approximately 1-3% of the entire image area. Spot metering is typically not influenced by the brightness of other sceneries outside a light metering area. Therefore, spot metering may be used to meter the brightness of respective regions of an object to be photographed or a background area.

Along with the wide application of touch screens, using a camera or a smartphone provided with a touch screen, a user may select a position for spot focusing by clicking a spot on a preview interface, thereby improving the utility of spot metering.

In conventional technologies of spot metering, firstly a light metering spot is determined, which may be a center spot in a preview interface, or a spot in a preview interface selected by a user through a touch screen. Then a rectangle or a circle is generated by taking the light metering spot as a center, which may deviate toward a center region when reaching a boundary of the screen. During light metering, the rectangle or the circle may be used as the light metering range.

SUMMARY

According to a first aspect of the present disclosure, there is provided a light metering method, comprising: acquiring a touch screen point inputted by a user; identifying an initial light metering area based on an image displayed on a touchscreen, the initial light metering area containing the touch screen point; segmenting the initial light metering area into a background region and an object region containing the touch screen point; and performing light metering on image points within the object region.

According to a second aspect of the present disclosure, there is provided a terminal device for light metering, comprising: a processor; and a memory for storing instructions executable by the processor. The processor is configured to: acquire a touch screen point inputted by a user; identify an initial light metering area based on an image displayed on a touchscreen, the initial light metering area containing the touch screen point; segment the initial light metering area into a background region and an object region containing the touch screen point; and perform light metering on image points within the object region.

According to a third aspect of the present disclosure, there is provided a non-transitory computer-readable storage medium having stored therein instructions that, when executed by a processor of a device, cause the device to perform a light metering method comprising: acquiring a touch screen point inputted by a user; identifying an initial light metering area based on an image displayed on a touchscreen, the initial light metering area containing the touch screen point; segmenting the initial light metering area into a background region and an object region containing the touch screen point; and performing light metering on image points within the object region.

It is to be understood that both the foregoing general description and the following detailed description are exemplary rather than limiting the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
FIG. 1 is a diagram showing an object to be photographed, according to an exemplary embodiment.

FIG. 1 is a diagram showing an object 100 to be photographed, according to an exemplary embodiment. As shown in FIG. 1, when a user clicks on a touch screen the left hand of the person at the position of the white spot in FIG. 1, the hand may be selected as a light metering spot, and the light metering region may be the white box region shown in the FIG. 1.

Figure 2:
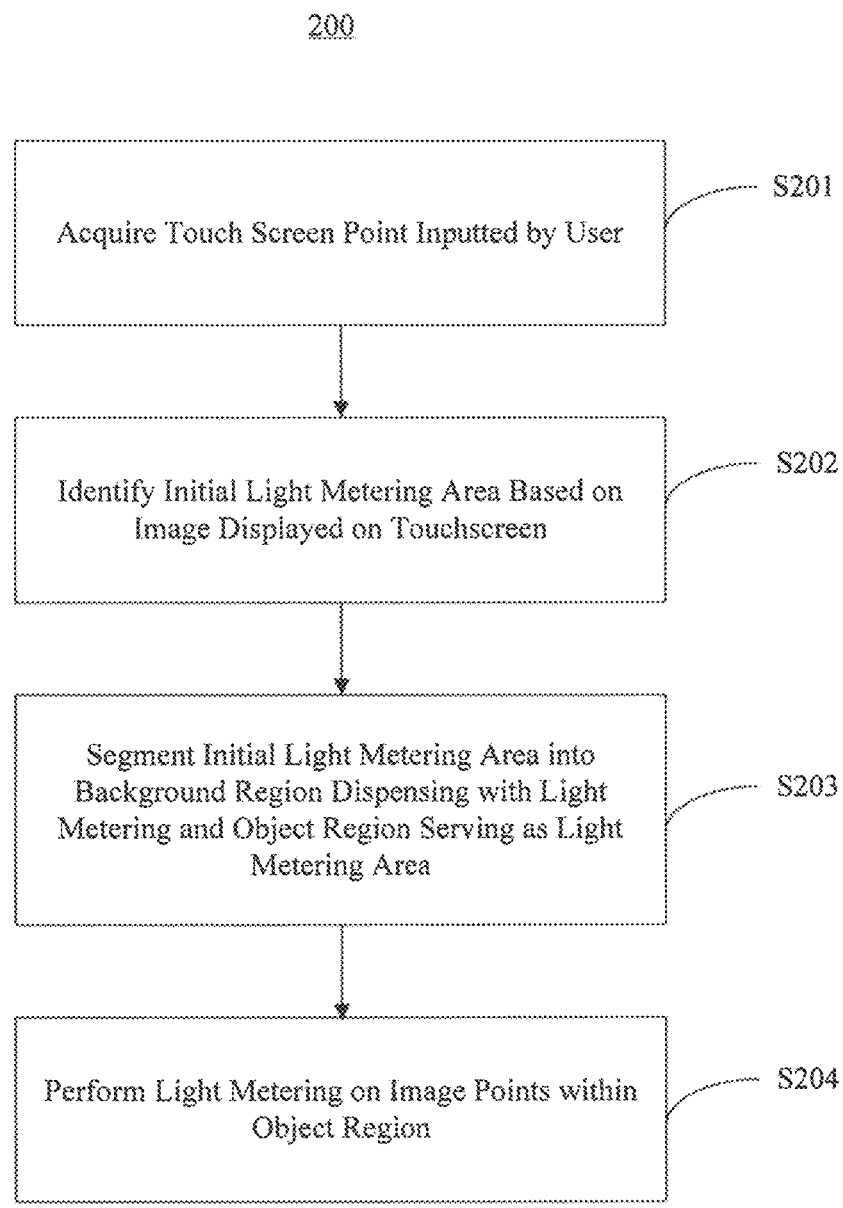
FIG. 2 is a flowchart of a light metering method, according to an exemplary embodiment.

FIG. 2 is a flowchart of a light metering method 200, according to an exemplary embodiment. The light metering method may be used in a terminal device. Referring to FIG. 2, the method 200 includes the following steps.

In step S201, the terminal device acquires a touch screen point inputted by a user. The touch screen point is located in a light metering area. A user may click on the touch screen to initiate light metering on a partial area of the entire image. The touch screen point is a reference point for subsequent image segmentation.

In step S202, the terminal device identifies an initial light metering area based on the image displayed on the touchscreen. The initial light metering area contains the touch screen point. For example, the terminal device may identify the entire image displayed on the touchscreen which contains the touch screen point as the initial light metering area. In some embodiments, a rectangular region may be defined by taking the touch screen point as a center, and the light metering range may be identified as image points within the rectangular region.

In some scenarios, the rectangular region may be broader than the image region where light metering is required. In other words, the initial light metering area may include some regions where no light metering is required, and these regions may interfere with light metering on the regions where light metering is required, causing the light metering result to be inaccurate. For example, in FIG. 1, within the rectangular region, light metering may not be required in the region containing cuffs of the clothes.

In step S203, the terminal device segments the initial light metering area into a background region dispensing with light metering and an object region serving as a light metering area. The object region contains the touch screen point. For example, the terminal device may segment the initial light metering area using a segmentation algorithm. The initial light metering area may be segmented into first and second parts: a region requiring no light metering, i.e., the background region, and a region containing the touch screen point and serving as the light metering area, i.e., the object region. Thus, an image region which does not require light metering is differentiated from an image region which requires light metering.

In step S204, the terminal device performs light metering on image points in the object region.

By segmenting an initial light metering area into a background region dispensing with light metering and an object region serving as a light metering area, the method 200 avoids interference of image points in a background region with image points in an object region during light metering, thus improving the metering accuracy of image points within the object region.

Figure 3:
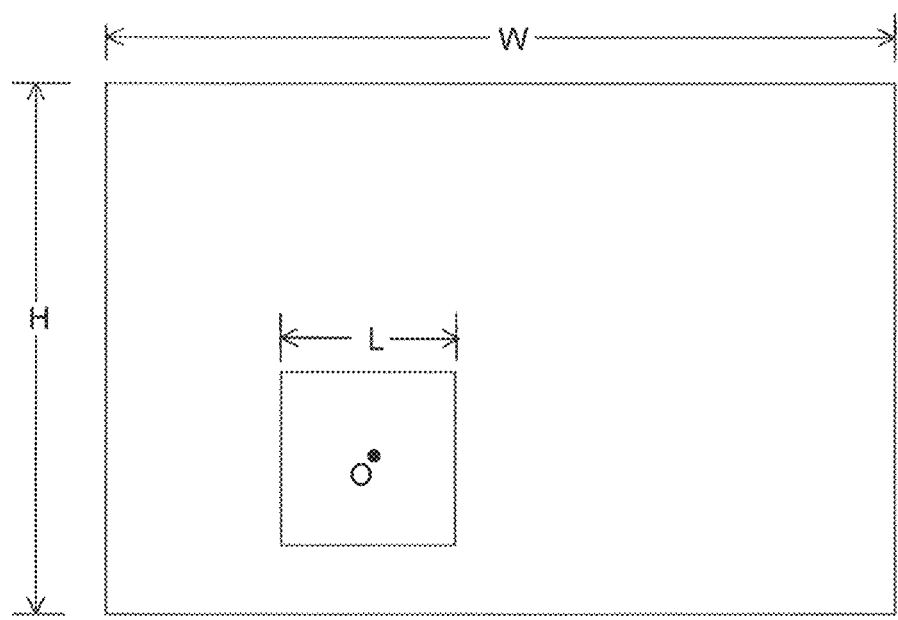
FIG. 3 is a schematic diagram of an initial light metering area, according to an exemplary embodiment.

FIG. 3 is a schematic diagram of an initial light metering area of a preview image 300, according to an exemplary embodiment. In some embodiments, in order to cover a target focusing region to the extent possible, a light metering range may be defined to occupy approximately 1~8% of an area of the entire preview image. As shown in FIG. 3, the square region with a side length L is an initial light metering area. The square takes the touch screen point as a center, and the side length L may be calculated by the following formula: L=sqrt (W*H*8/100), where sqrt represents a square root calculation, H represents the length of the preview image, and W represents the width of the preview image.

The initial light metering area may be different from the object region serving as the light metering area, and the object region may be determined by performing image segmentation on the initial light metering area.

Figure 4:
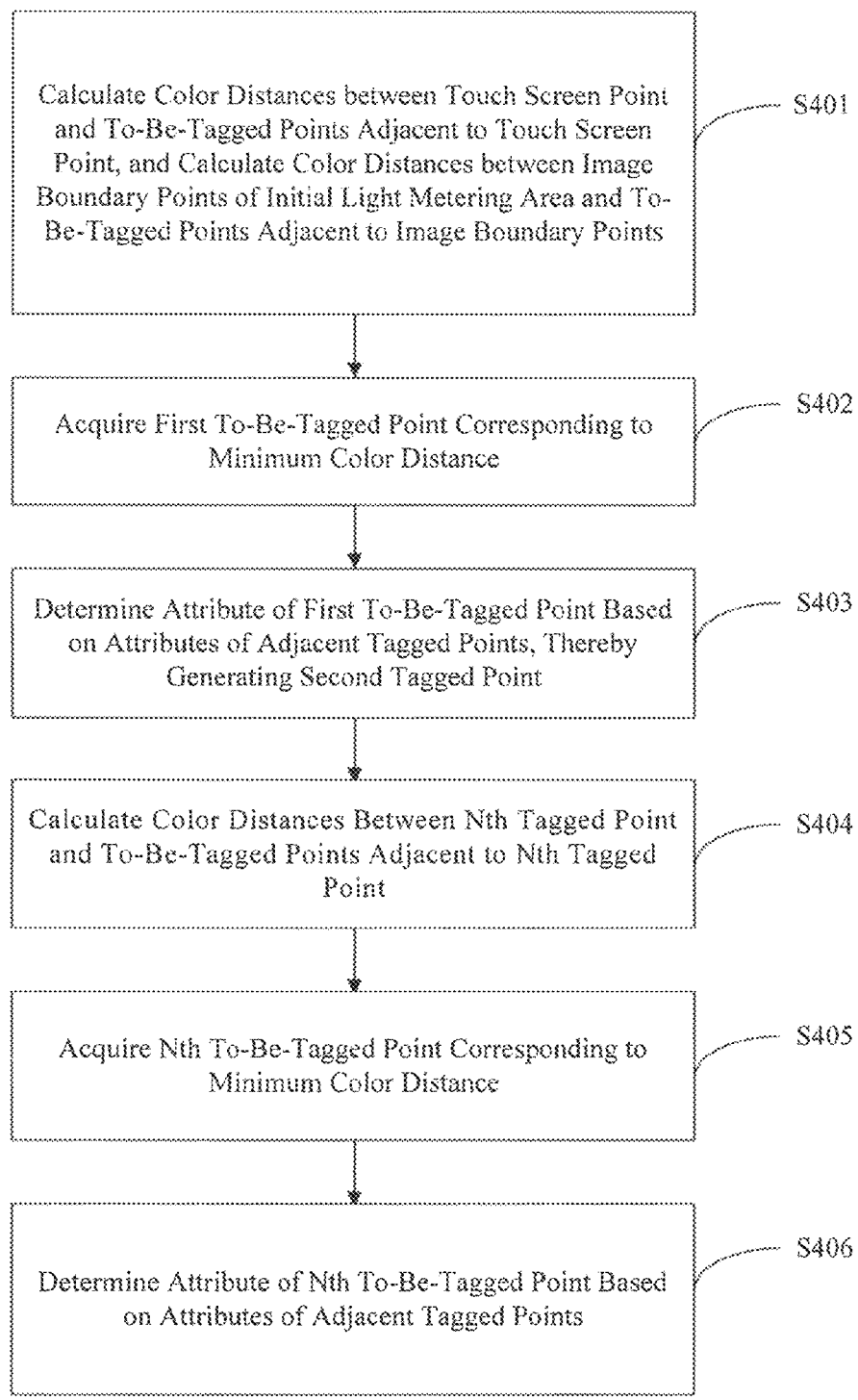
FIG. 4 is a flowchart of a method for image segmentation, according to an exemplary embodiment.

FIG. 4 is a flowchart of a method 400 for image segmentation, according to an exemplary embodiment. Prior to describing the image segmentation method 400, some terms used in connection with the method 400 are explained below.

1. Adjacent points: in the present disclosure, adjacent points to an image point refer to points situated in four directions (up, down, left and right) of the image point.

2. Color distance: supposing two image points P1 and P2, a RGB color value corresponding to P1 is P1 (r1, g1, b1), a RGB color value corresponding to P2 is P2 (r2, g2, b2), abs represents an absolute value function, r=abs(r1−r2), g=abs (g1−g2), b=abs(b1−b2), and color distances between P1 and P2 is a maximum value among r, g, and b.

Typically, as the range of RGB color value is [0, 255], the range of color distance between two image points is also [0, 255].

3. Segmentation points: in the present disclosure, segmentation points refer to image points intersecting with both an object region and a background region.

4. Tagged points: tagged points refer to image points whose attributes have been determined. In the present disclosure, attributes of tagged points are classified into: object region points (including a touch screen point), background region points (including image boundary points of an initial light metering area), and segmentation points.

5. To-be-tagged points: to-be-tagged points refer to image points adjacent to (in up, down, left or right direction) tagged points and whose attributes are to be determined.

In step S401, the terminal device calculates color distances between the touch screen point and to-be-tagged points adjacent to the touch screen point (in up, down, left or right direction), and color distances between image boundary points of the initial light metering area and to-be-tagged points adjacent to the image boundary points. As explained above, the attributes of the image points include object region points, background region points, and segmentation points.

In step S402, the terminal device acquires a first to-be-tagged point corresponding to a minimum color distance among the calculated color distances.

In step S403, the terminal device determines an attribute of the first to-be-tagged point based on attributes of tagged points adjacent to the first to-be-tagged point (in up, down, left or right direction), thereby generating a second tagged point. In some embodiments, the touch screen point having an attribute of an object region point may be determined as the first tagged point. As the attribute of the first to-be-tagged point is determined, the first to-be-tagged point becomes the second tagged point.

In some embodiments, initial object region points include the touch screen point, initial background region points include points on an image boundary of the initial light metering area, initial to-be-tagged points include image points adjacent to the initial object region and image points adjacent to the initial background region. Thus, an attribute of a first to-be-tagged point can be an object region point or a background region point.

In step S404, the terminal device calculates color distances between an Nth tagged point and to-be-tagged points adjacent to the Nth tagged point (in up, down, left or right direction), where N is a number greater than or equal to 2.

In step S405, the terminal device acquires an Nth to-be-tagged point corresponding to a minimum color distance among the calculated color distances associated with the Nth tagged point.

In step S406, the terminal device determines an attribute of the Nth to-be-tagged point based on attributes of tagged points adjacent to the Nth to-be-tagged point (in up, down, left or right direction). Steps 404-406 are to be repeated until attributes of all the to-be-tagged points in the initial light metering area are determined.

In the step S406, attribute of the Nth tagged point may be an object region point, a background region point or a segmentation points. Correspondingly, attribute of the Nth to-be-tagged point may be an object region point, a background region point or a segmentation point.

After attributes of all to-be-tagged points are determined, an object region composed of object region points and a background region composed of background region points are determined. The object region and the background region are segmented by segmentation points.

Figure 5:
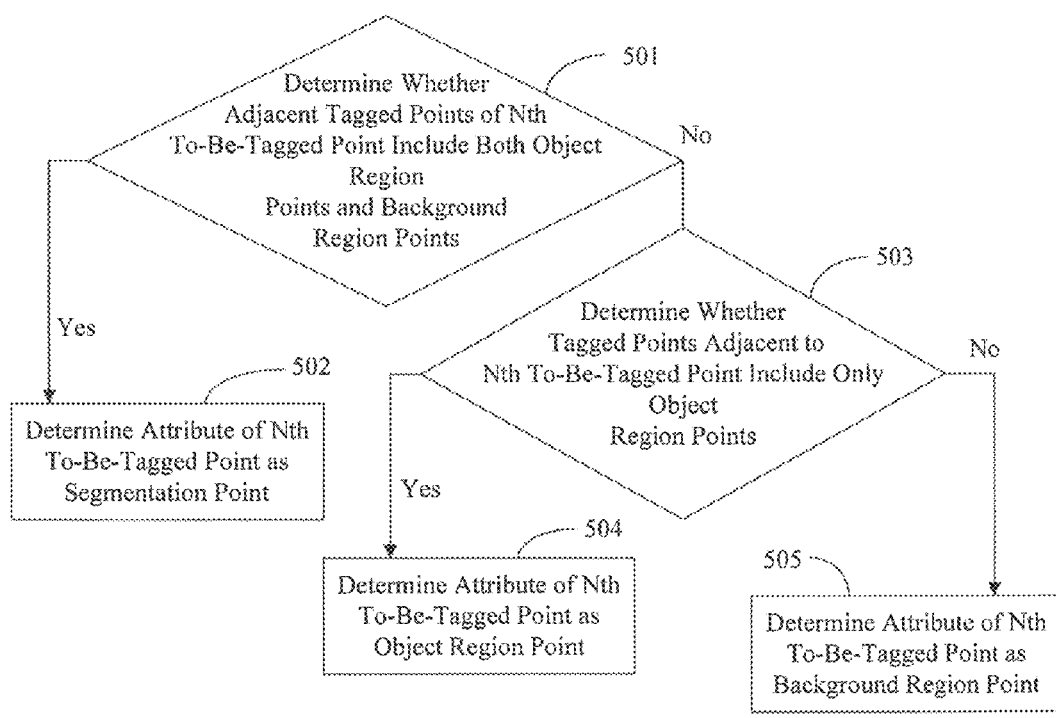
FIG. 5 is a flowchart of a method for determining an attribute of an Nth to-be-tagged point, according to an exemplary embodiment.

FIG. 5 is a flowchart of a method 500 for determining an attribute of an Nth to-be-tagged point, according to an exemplary embodiment. In step S501, the terminal device determines whether adjacent tagged points of the Nth to-be-tagged point (in up, down, left or right direction) include both object region points and background region points. If so, the method 500 proceeds to step S502. If the adjacent tagged points do not include both object region points and background region points, the method 500 proceeds to step S503.

In step S502, the terminal device determines an attribute of the Nth to-be-tagged point as a segmentation point.

In step S503, the terminal device determines whether tagged points adjacent to the Nth to-be-tagged point (in up, down, left or right direction) include only object region points. If so, the method 500 proceeds to step S504. If the adjacent tagged points include points other than object region points, the method 500 proceeds to step S505.

In step S504, the terminal device determines an attribute of the Nth to-be-tagged point as an object region point.

In step S505, the terminal device determines an attribute of the Nth to-be-tagged point as a background region point.

Figure 6:
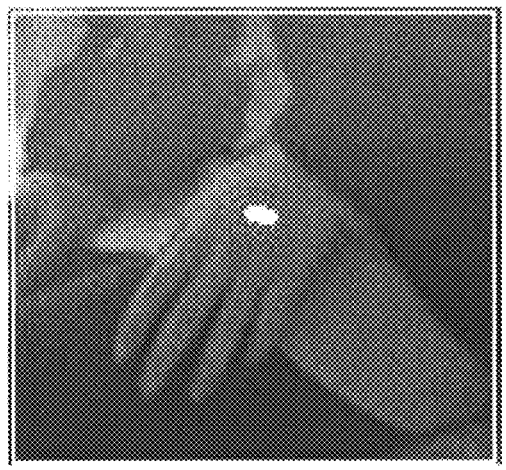
FIG. 6 is a diagram illustrating an initial light metering area, according to an exemplary embodiment.

For example, in FIG. 1, when a user clicks the position of a white spot (situated at the left hand of the person in FIG. 1) on a touch screen, the hand is taken as a light metering spot, and the terminal device identifies an initial light metering area containing the touch screen point. FIG. 6 is a diagram illustrating an initial light metering area 600, according to an exemplary embodiment. As shown in FIG. 6, the initial light metering area includes both a left hand image requiring light metering and clothes parts of left hand cuff and right hand cuff. It is thus necessary to segment the initial light metering area into a background region dispensing with light metering and an object region containing the touch screen point and serving as the light metering area.

Figure 7:
FIG. 7 is a diagram illustrating an object region, according to an exemplary embodiment.

FIG. 7 is a diagram illustrating an object region 700, according to an exemplary embodiment. Segmentation points may be acquired using the above described image segmentation method. As shown in FIG. 7, a segmentation line including all the segmentation points is formed to define the person's left hand region. Correspondingly, image points in the left hand region are light metered, thereby avoiding interference on the light metering result when the difference between color of clothes parts and the skin color of the left hand is relatively great.

Figure 8:
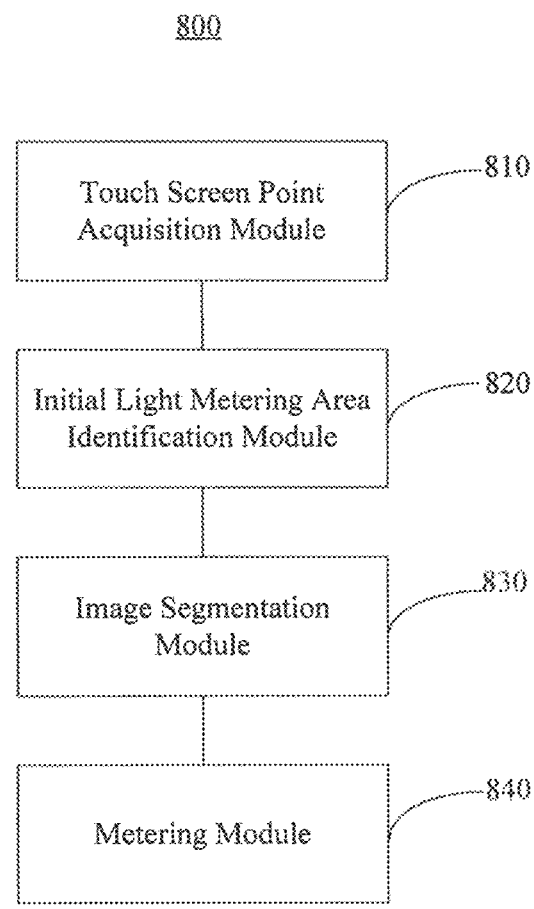
FIG. 8 is a block diagram of a light metering device, according to an exemplary embodiment.

FIG. 8 is a block diagram of a light metering device 800, according to an exemplary embodiment. Referring to FIG. 8, the device 800 includes a touch screen point acquisition module 810, an initial light metering area identification module 820, an image segmentation module 830, and a metering module 840.

The touch screen point acquisition module 810 is configured to acquire a touch screen point inputted by a user. The touch screen point is located in a light metering area.

The initial light metering area identification module 820 is configured to identify an initial light metering area containing the touch screen point based on an image displayed on a touchscreen.

The image segmentation module 830 is configured to segment the initial light metering area into a background region dispensing with light metering and an object region serving as a light metering area and containing the touch screen point.

The metering module 840 is configured to perform light metering on image points within the object region.

Figure 9:
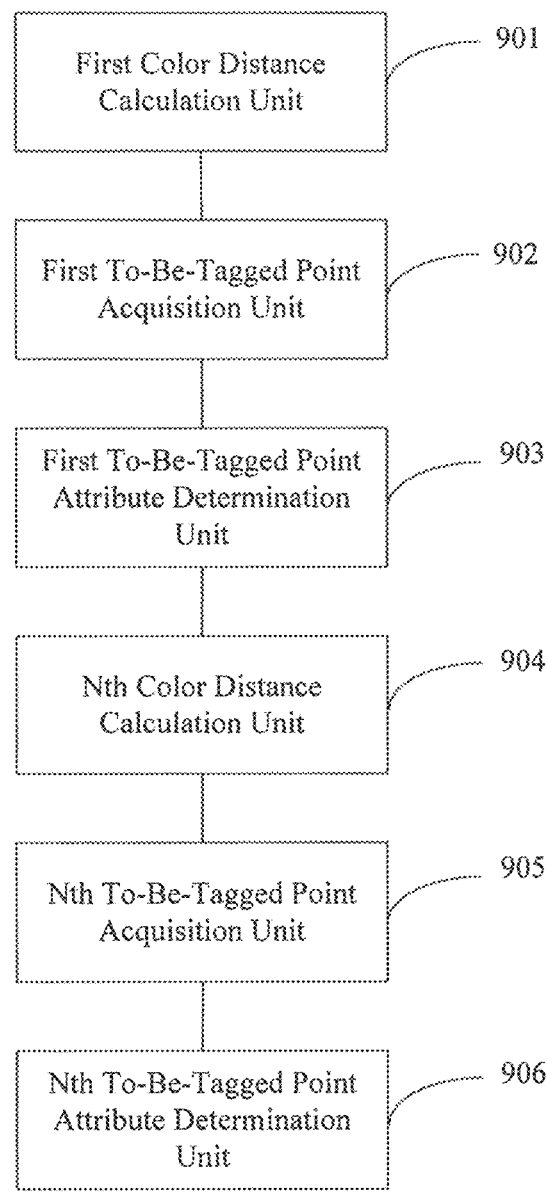
FIG. 9 is a block diagram of an image segmentation module, according to an exemplary embodiment.

FIG. 9 is a block diagram of the image segmentation module 830 (FIG. 8), according to an exemplary embodiment. Referring to FIG. 9, the image segmentation module 830 includes a first color distance calculation unit 901, a first to-be-tagged point acquisition unit 902, a first to-be-tagged point attribute determination unit 903, an Nth color distance calculation unit 904, an Nth to-be-tagged point acquisition unit 905, and an Nth to-be-tagged point attribute determination unit 906.

The first color distance calculation unit 901 is configured to calculate color distances between the touch screen point and to-be-tagged points adjacent to the touch screen point (in up, down, left or right direction), and calculate color distances between to-be-tagged points adjacent to image boundary points of the initial light metering area and the image boundary points.

The first to-be-tagged point acquisition unit 902 is configured to acquire a first to-be-tagged point corresponding to a minimum color distance of the calculated color distances.

The first to-be-tagged point attribute determination unit 903 is configured to determine, based on attributes of adjacent tagged points of the first to-be-tagged point (in up, down, left or right direction), an attribute of the first to-be-tagged point.

The Nth color distance calculation unit 904 is configured to calculate color distances between the Nth tagged point and to-be-tagged points adjacent to the Nth (N being a number greater than or equal to 2) tagged point (in up, down, left or right direction).

The Nth to-be-tagged point acquisition unit 905 is configured to acquire an Nth to-be-tagged point corresponding to a minimum color distance of the calculated color distances associated with the Nth tagged point.

The Nth to-be-tagged point attribute determination unit 906 is configured to determine, based on attributes of adjacent tagged points of the Nth to-be-tagged point (in up, down, left or right direction), an attribute of the Nth to-be-tagged point.

Figure 10:
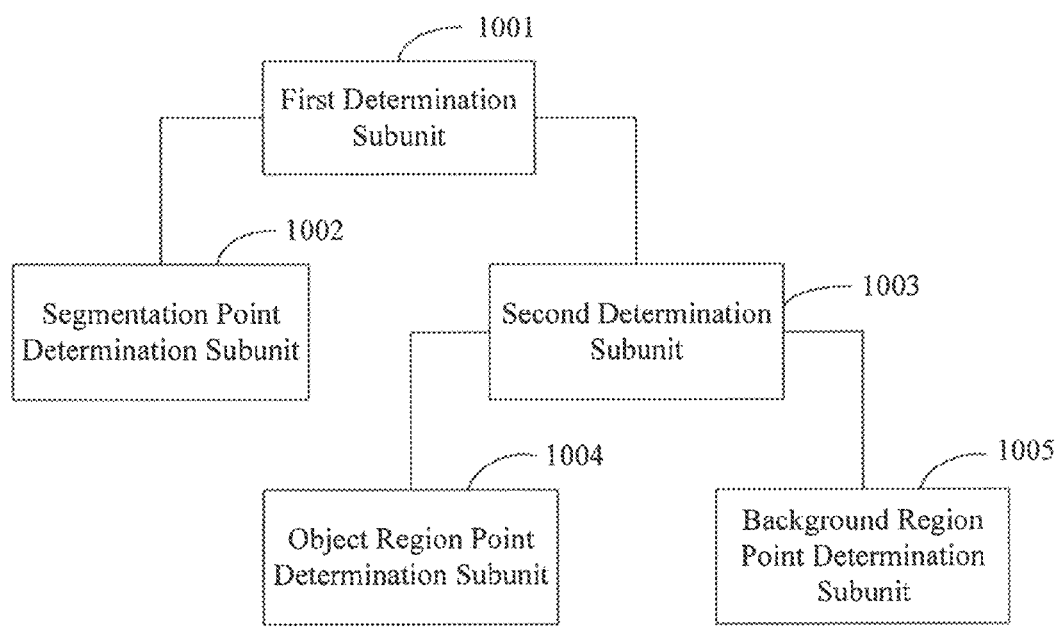
FIG. 10 is a block diagram of an Nth to-be-tagged point attribute determination unit, according to an exemplary embodiment.

FIG. 10 is a block diagram of the Nth to-be-tagged point attribute determination unit 906 (FIG. 9), according to an exemplary embodiment. Referring to FIG. 10, the Nth to-be-tagged point attribute determination unit 906 includes a first determination subunit 1001, a segmentation point determination subunit 1002, a second determination subunit 1003, an object region point determination subunit 1004, and a background region point determination subunit 1005.

The first determination subunit 1001 is configured to determine whether adjacent tagged points of the Nth to-be-tagged point (in up, down, left or right direction) include both object region points and background region points, and trigger a segmentation point determination subunit 1002 if the adjacent tagged points include both object region points and background region points. If the adjacent tagged points do not include both object region points and background region points, the first determination subunit 1001 is configured to trigger a second determination subunit 1003.

The segmentation point determination subunit 1002 is configured to determine an attribute of the Nth to-be-tagged point as a segmentation point if the adjacent tagged points of the Nth to-be-tagged point include both object region points and background region points.

The second determination subunit 1003 is configured to determine whether adjacent tagged points of the Nth to-be-tagged point (in up, down, left or right direction) only include object region points, and if so, trigger an object region point determination subunit 1004. If the adjacent tagged points include image points other than object region points, the second determination subunit 1003 is configured to trigger a background region point determination subunit 1005.

The object region point determination subunit 1004 is configured to determine an attribute of the Nth to-be-tagged point as an object region point.

The background region point determination subunit 1005 is configured to determine an attribute of the Nth to-be-tagged point as a background region point.

Figure 11:
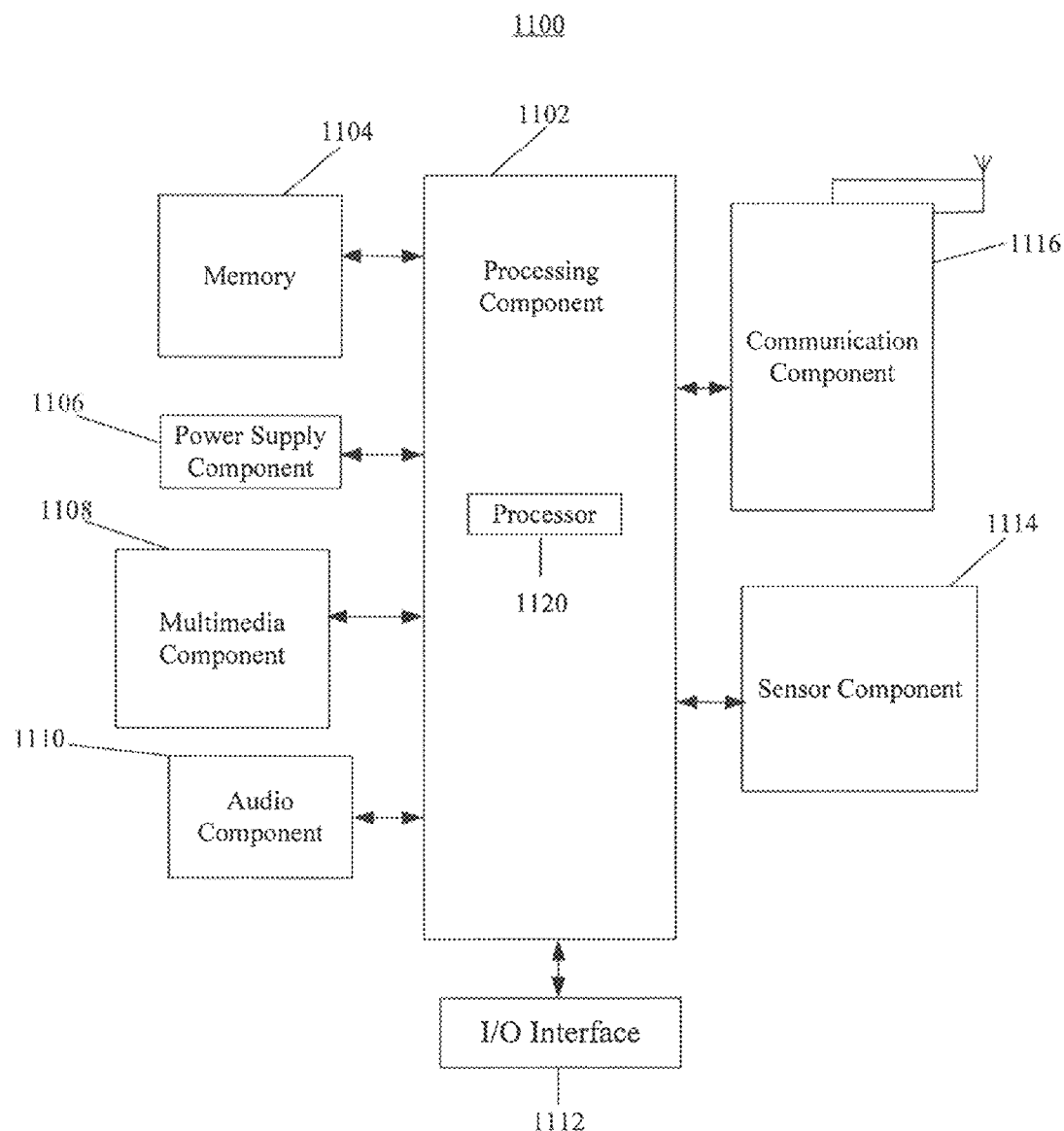
FIG. 11 is a block diagram of a terminal device, according to an exemplary embodiment.

FIG. 11 is a block diagram of a terminal device 1100, according to an exemplary embodiment. For example, the terminal device 1100 may be a mobile telephone, a computer, a digital broadcasting terminal, a message transceiver device, a games console, a tablet device, a medical device, a fitness facility, a PDA (personal digital assistant) and the like.

Referring to FIG. 11, the terminal device 1100 may include one or a plurality of components as below: a processor component 1102, a memory 1104, a power supply component 1106, a multimedia component 1108, an audio component 1110, an input/output (I/O) interface 1112, a sensor component 1114 and a communication component 1116. The person skilled in the art should appreciate that the structure of the terminal device 1100 as shown in FIG. 11 does not intend to limit the terminal device 1100. The terminal device 1100 may include more or less components or combine some components or other different components.

The processor component 1102 usually controls the overall operation of the terminal device 1100, for example, display, telephone call, data communication, and operation associated with camera operation and record operation. The processor component 1102 may include one or a plurality of processors 1120 for executing instructions so as to complete steps of above method in part or in whole. In addition, the processor component 1102 may include one or a plurality of modules for the convenience of interaction between the processor component 1102 and other components. For example, the processor component 1102 may include a multimedia module for the convenience of interaction between the multimedia component 1108 and the processor component 1102.

The memory 1104 is configured to store data of different types so as to support the operation of the terminal device 1100. Examples of the data include any application program or approach directive for operation of the terminal device 1100, including contact data, phonebook data, message, picture and video, etc. The memory 1104 is also configured to store programs and modules. The processing component 1102 performs various functions and data processing by operating programs and modules stored in the memory 1104. The memory 1104 may be realized by volatile or non-volatile memory device of any type or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 1106 is configured to provide power for components of the terminal device 1100. The power supply component 1106 may include a power management system, one or a plurality of power supplies, and/or other components associated with generation, management and power distribution of the terminal device 1100.

The multimedia component 1108 includes a screen between the terminal device 1100 and a user and for providing an output interface. In some embodiments, the screen may include an LCD (Liquid Crystal Display) and/or a touch panel (TP). If the screen includes a touch panel, the screen may be realized as a touch screen for receiving input signal from users. The touch panel includes one or a plurality of touch sensors for sensing gestures on the touch panel, for example, touching and sliding, etc. The touch sensor not only can sensor trip boundary of touching or sliding, but also can detect the duration and pressure related to the touching or sliding operation. In some embodiments, the multimedia component 1108 includes a front-facing camera and/or a rear-facing camera. When the terminal device 1100 is under an operation mode, for example, capture mode or video mode, the front-facing camera and/or the rear-facing camera may receive external multimedia data. Each front-facing camera and rear-facing camera may be a fixed optical lens system or have focal length and optical zoom capacity.

The audio component 1110 is configured to output and/or input audio signal. For example, the audio component 1110 includes a microphone configured to receive an external audio signal when the terminal device 1100 is under an operation mode such as call mode, record mode and speech recognition mode. The audio signal received may be further stored in the memory 1104 or sent out by the communication component 1116. In some embodiments, the audio component 1110 also includes a loudspeaker for outputting audio signal.

The I/O interface 1112 provides interface for the processor component 1102 and peripheral interface modules, the peripheral interface modules may be a keyboard, a click wheel and buttons, etc. These buttons may include but not limited to: home button, volume button, start button and locking button.

The sensor component 1114 includes one or a plurality of sensors for providing the terminal device 1100 with state evaluation from all aspects. For example, the sensor component 1114 may detect the on/off state of the terminal device 1100, relative positioning of components, for example, the components are the displayer and keypads of the terminal device 1100. The sensor component 1114 also may detect the position change of the terminal device 1100 or a component thereof, the presence or absence of users' touch on the terminal device 1100, the direction or acceleration/deceleration of the terminal device 1100, and temperature variation of the terminal device 1100. The sensor component 1114 may also include a proximity detector, which is configured to detect the presence of nearby objects without any physical contact. The sensor component 1114 may also include an optical sensor, for example, CMOS or CCD image sensor for imaging. In some embodiments, the sensor component 1114 may also include an acceleration sensor, a gyro sensor, a magnetic sensor, a pressure sensor, or a temperature sensor.

The communication component 1116 is configured to facilitate wired communication or wireless communication between the terminal device 1100 and other equipment. The terminal device 1100 is available for access to wireless network based on communication standards, for example, WiFi, 2G or 3G, or combination thereof. In an exemplary embodiment, the communication component 1116 receives by means of a broadcast channel the broadcast signal or information from external broadcast management systems. In an exemplary embodiment, the communication component 1116 also includes a near field communication (NFC) module for promoting short-range communication. For example, the NFC module may be realized on the basis of Radio Frequency Determination (RFID) Technology, Infrared Data Association (IrDA) Technology, Ultra-wide Bandwidth (UWB) Technology, Bluetooth (BT) Technology and other technologies.

In exemplary embodiments, the terminal device 1100 may be implemented with one or a plurality of application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, for performing the above described methods.

In exemplary embodiments, a non-transitory computer-readable storage medium including instructions is also provided, such as the memory 1104 including instructions, and the instructions may be executed by the processors 1120 of the terminal device 1100, for performing the above-described methods. For example, the non-transitory computer-readable storage medium may be ROM, random access memory (RAM), CD-ROM, magnetic tape, floppy disk and optical data storage device, etc.

It should be understood by those skilled in the art that the above described methods, devices, and modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the exact construction that has been described above and illustrated in the accompanying drawings, and that various modifications and changes can be made without departing from the scope thereof. It is intended that the scope of the invention should only be limited by the appended claims.

What is claimed is:

1. A light metering method, comprising:
acquiring a touch screen point inputted by a user;
identifying an initial light metering area based on an image displayed on a touchscreen, the initial light metering area containing the touch screen point;
segmenting the initial light metering area into a background region and an object region containing the touch screen point, wherein the segmenting includes:
calculating color distances between the touch screen point and to-be-tagged points adjacent to the touch screen point based on an RGB color value of the touch screen point and RGB color values of the to-be-tagged points adjacent to the touch screen point; and
calculating color distances between image boundary points of the initial light metering area and to-be-tagged points adjacent to the image boundary points based on RGB color values of the image boundary points and RGB color values of the to-be-tagged points adjacent to image boundary points; and
performing light metering on image points within the object region.

2. The method according to claim 1, further comprising:
acquiring a first to-be-tagged point corresponding to a minimum color distance among the calculated color distances; and
determining, based on attributes of tagged points adjacent to the first to-be-tagged point, an attribute of the first to-be-tagged point.

3. The method according to claim 2, further comprising:
calculating color distances between an Nth tagged point and to-be-tagged points adjacent to the Nth tagged point, N being a number greater than or equal to 2;
acquiring an Nth to-be-tagged point corresponding to a minimum color distance among the calculated color distances associated with the Nth tagged point; and
determining, based on attributes of tagged points adjacent to the Nth to-be-tagged point, an attribute of the Nth to-be-tagged point.

4. The method according to claim 3, further comprising:
determining the attribute of the Nth to-be-tagged point as a segmentation point if the tagged points adjacent to the Nth to-be-tagged point include at least one object region point and at least one background region point;
determining the attribute of the Nth to-be-tagged point as an object region point if the tagged points adjacent to the Nth to-be-tagged point include only object region points; and
determining the attribute of the Nth to-be-tagged point as a background region point if the tagged points adjacent to the Nth to-be-tagged point include only background region points.

5. The method according to claim 2, wherein an attribute of the touch screen point is an object region point, and attributes of the image boundary points are background region points.

6. The method according to claim 1, wherein the initial light metering area occupies 1~8% of an area of the image displayed on the touchscreen.

7. A terminal device for light metering, comprising:
a processor; and
a memory for storing instructions executable by the processor;
wherein the processor is configured to:
acquire a touch screen point inputted by a user;
identify an initial light metering area based on an image displayed on a touchscreen, the initial light metering area containing the touch screen point;
segment the initial light metering area into a background region and an object region containing the touch screen point; and
perform light metering on image points within the object region,
wherein, in segmenting the initial light metering area, the processor is further configured to:
calculate color distances between the touch screen point and to-be-tagged points adjacent to the touch screen point based on an RGB color value of the touch screen point and RGB color values of the to-be-tagged points adjacent to the touch screen point; and
calculate color distances between image boundary points of the initial light metering area and to-be-tagged points adjacent to the image boundary points based on RGB color values of the image boundary points and RGB color values of the to-be-tagged points adjacent to image boundary points.

8. The terminal device according to claim 7, wherein the processor is further configured to:
acquire a first to-be-tagged point corresponding to a minimum color distance among the calculated color distances; and
determine, based on attributes of tagged points adjacent to the first to-be-tagged point, an attribute of the first to-be-tagged point.

9. The terminal device according to claim 8, wherein the processor is further configured to:
calculate color distances between an Nth tagged point and to-be-tagged points adjacent to the Nth tagged point, N being a number greater than or equal to 2;
acquire an Nth to-be-tagged point corresponding to a minimum color distance among the calculated color distances associated with the Nth tagged point; and
determine, based on attributes of tagged points adjacent to the Nth to-be-tagged point, an attribute of the Nth to-be-tagged point.

10. The terminal device according to claim 9, wherein the processor is further configured to:
determine the attribute of the Nth to-be-tagged point as a segmentation point if the tagged points adjacent to the Nth to-be-tagged point include at least one object region point and at least one background region point;
determine the attribute of the Nth to-be-tagged point as an object region point if the tagged points adjacent to the Nth to-be-tagged point include only object region points; and
determine the attribute of the Nth to-be-tagged point as a background region point if the tagged points adjacent to the Nth to-be-tagged point include only background region points.

11. The terminal device according to claim 8, wherein an attribute of the touch screen point is an object region point, and attributes of the image boundary points are background region points.

12. The terminal device according to claim 7, wherein the initial light metering area occupies 1~8% of an area of the image displayed on the touchscreen.

13. A non-transitory computer-readable storage medium having stored therein instructions that, when executed by a processor of a device, cause the device to perform a light metering method comprising:
acquiring a touch screen point inputted by a user;
identifying an initial light metering area based on an image displayed on a touchscreen, the initial light metering area containing the touch screen point;
segmenting the initial light metering area into a background region and an object region containing the touch screen point, wherein the segmenting includes:
calculating color distances between the touch screen point and to-be-tagged points adjacent to the touch screen point based on an RGB color value of the touch screen point and RGB color values of the to-be-tagged points adjacent to the touch screen point; and
calculating color distances between image boundary points of the initial light metering area and to-be-tagged points adjacent to the image boundary points based on RGB color values of the image boundary points and RGB color values of the to-be-tagged points adjacent to image boundary points; and
performing light metering on image points within the object region.

14. The medium according to claim 13, wherein the light metering method further comprises:
acquiring a first to-be-tagged point corresponding to a minimum color distance among the calculated color distances; and
determining, based on attributes of adjacent tagged points of the first to-be-tagged point, an attribute of the first to-be-tagged point.

15. The medium according to claim 14, wherein the light metering method further comprises:
calculating color distances between an Nth tagged point and to-be-tagged points adjacent to the Nth tagged point, N being a number greater than or equal to 2;
acquiring an Nth to-be-tagged point corresponding to a minimum color distance among the calculated color distances associated with the Nth tagged point; and
determining, based on attributes of tagged points adjacent to the Nth to-be-tagged point, an attribute of the Nth to-be-tagged point.

16. The medium according to claim 15, wherein the light metering method further comprises:
determining the attribute of the Nth to-be-tagged point as a segmentation point if the tagged points adjacent to the Nth to-be-tagged point include at least one object region point and at least one background region point;
determining the attribute of the Nth to-be-tagged point as an object region point if the tagged points adjacent to the Nth to-be-tagged point include only object region points; and
determining the attribute of the Nth to-be-tagged point as a background region point if the tagged points adjacent to the Nth to-be-tagged point include only background region points.

17. The medium according to claim 14, wherein an attribute of the touch screen point is an object region point, and attributes of the image boundary points are background region points.

18. The medium according to claim 13, wherein the initial light metering area occupies 1~8% of an area of the image displayed on the touchscreen.

* * * * *